3,594,432
PREPARATION OF CAROTENOID COMPOUNDS
Jacques Morel, Tassin-la-Demi-Lune, France, assignor to
  Rhone-Poulenc S.A., Paris, France
No Drawing. Filed Jan. 15, 1970, Ser. No. 3,208
Claims priority, application France, Jan. 17, 1969,
  826
Int. Cl. C07c 5/14
U.S. Cl. 260—666                                    9 Claims

ABSTRACT OF THE DISCLOSURE

Retrodehydro-β-carotene is produced in improved yield by brominating β-carotene with N-bromosuccinimide and then dehydrobrominating the resulting 4-bromo - β - carotene in the presence of an alkali metal iodide.

---

The present invention provides a process for the preparation of dehydropolyene compounds from the corresponding polyene compounds. More particularly, the present invention provides a process for the preparation of retrodehydro-β-carotene from β-carotene.

Retrodehydro-β-carotene is used as a colouring agent in food-stuffs and as an intermediate in organic synthesis.

Various processes for the synthesis of retrodehydro-β-carotene are known which start from compounds such as vitamin A or β-ionone, the chemical preparation of which requires several stages. Retrodehydro-β-carotene has also been prepared from β-carotene (which is a natural product) by reacting the latter with N-bromosuccinimide and then treating the brominated derivative with a tertiary base [Karrer, Helvetica Chimica Acta, 41, 984, (1958)].

However, in this case the yield is low (24%) and an improvement of this yield was essential for the process to be applied on an industrial scale.

It has now been found, and it is this which forms the subject of the present invention, that a retrodehydro-β-carotene of excellent degree of purity may be prepared from β-carotene in very good yields.

According to the present invention, there is provided a process for the preparation of dehydro-β-carotene which comprises (i) reacting β-carotene with N-bromosuccinimide followed by (ii) debrominating the resulting brominated derivative in the presence of an alkali metal iodide.

Step (i) of the process consists in preparing 4-β-monobromo-carotene (which by dehydrobromination and rearrangement thereafter yields retrodehydro-β-carotene) in accordance with the following reaction scheme:

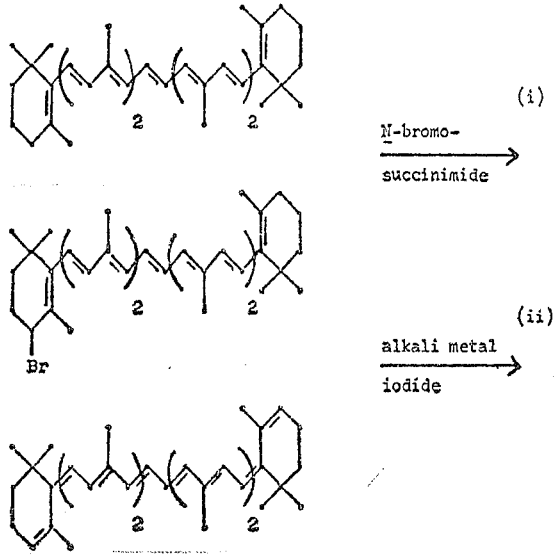

In order to carry out step (i), 1 to 3 mols, and preferably 1.5 to 2 mols, of N-bromosuccinimide per mol of β-carotene are reacted in a solvent which must be inert under the reaction conditions. Thus chloroform, which is the preferred solvent, must be freed of the ethanol which it contains by way of a stabiliser, since the yield of brominated derivative otherwise rapidly declines. As the bromination reaction is an extremely vigorous reaction and can rapidly yield a polybrominated β-carotene, it is necessary to carry out this reaction at a low temperature and as rapidly as possible. Experiments carried out at −20° C., −30° C., and even −70° C., have given very good results for reaction times not exceeding one minute. Furthermore, the yield of monobrominated derivative may be improved by adding, at the same time as the N-bromosuccinimide, an initiator for radical reactions, such as organic peroxides, for example benzoyl peroxide, in an amount of at most 3% by weight of the β-carotene.

Step (ii) of the process consists in adding an alkali metal iodide to the reaction mixture resulting from the first stage so as to decompose the excess N-bromosuccinimide and thus prevent the bromination reaction from continuing beyond the monobrominated derivative. This decomposition of the N-bromosuccinimide by the alkali metal iodide is accompanied by a liberation of iodine which can in turn be reduced by an alkali metal thiosulphate. The weight of alkali metal iodide employed in this second stage is 2 to 5 times the weight of the β-carotene; an excess does not, however, interfere with the reaction. First of all, the iodide is dissolved, for example in acetic acid, acetone or their mixture. Acetic acid is preferably used if the retrodehydro - β - carotene is desired to crystallise from the reaction mixture itself, from which the product may, therefore, be isolated by simple filtration. The treatment with the iodide can be carried out in the presence of an alkaline reagent such as an alkali carbonate or bicarbonate, for example 20 to 30 g. of sodium bicarbonate per gram of β-carotene, and the presence of such a reagent also results in an impovement in the yield. The temperature during this second stage is maintained between 0° and 20° C.

The purpose of the addition of an alkali metal thiosulphate is, as has been stated above, to neutralise the iodine liberated by decomposing the excess N-bromosuccinimide; an aqueous solution of the alkali metal thiosulphate is used for this purpose, the reaction being followed in accordance with the usual methods of determination.

The retrodehydro - β - carotene is isolated from the reaction mixture as crystals or in the form of a solution, depending on the solvent used during the treatment with the alkali metal iodide. In all cases a product of great purity, entirely in the trans-form, which can be directly used in the foodstuff industry or pharmaceutical industry is obtained.

The following examples illustrate the invention.

EXAMPLE 1

(1) Preparation of bromo-β-carotene 2.014 g. of β-carotene and 160 cm.³ of chloroform free from ethanol were introduced into a 500 cm.³ three-necked flask equipped with a stirrer system, a thermometer and a nitrogen inlet. The flask was cooled to between −30° C., and −40° C., and a solution of 1.254 g. of N-bromosuccinimide and of 0.060 g. of benzoyl peroxide in 40 cm.³ of acetonitrile was then run in. The N-bromosuccinimide was admitted rapidly in a single addition and the reaction was allowed to take place for 30 seconds.

The initial β-carotene showed the following absorption maxima 432 mμ ($E_{1\,cm.}^{1\%}$=240 in ethanol)

(2) Dehydrobromination to retrodehydro-β-carotene 720 cm.³ of acetic acid and 7.2 g. of potassium iodide dissolved in 48 cm.³ of water, followed by 48 g. of sodium bicarbonate, were introduced into an identical apparatus to that of the preceding stage but having a capacity of 2 litres. The mixture was stirred and cooled to about 10° C., the reaction mixture from the preceding stage was then admitted rapidly in a single addition; the flask was rinsed with 40 cm.³ of chloroform; and 72 cm.³ of an aqueous N/10 sodium thiosulphate solution were added. The mixture was stirred for 3 hours keeping the temperature at +10° C., and then filtered on a No. 3 sintered glass filter provided with Clarcel. The precipitate was washed on the filter with 3 portions of 20 cm.³ of acetic acid, was suction-dried, and then dissolved on the filter in 300 cm.³ of chloroform.

The chloroform was stripped from the resulting solution by distillation under reduced pressure so as not to exceed 40° C., and the removal of the solvent was completed at 30° C., under a vacuum of 0.5 mm. The distillation residue was taken up in 40 cm.³ of 1,2-dichloroethane and dissolved by heating on a water bath under nitrogen. The solution was cooled and kept at 3° C., for 15 hours. The crystals which have appeared were filtered off on a No. 3 sintered glass filter, washed with 2 portions of 10 cm.³ of ethanol and dried at 30° C., under a vacuum of 0.5 mm. 1.634 g. of retrodehydro-β-carotene were thus obtained (yield: 81.4% relative to the β-carotene), having a melting point (Kofler)=209° C., and showing the following absorption maxima:

448 mμ

472 mμ ($E_{1\,cm.}^{1\%}$=300 in ethanol)

502 mμ

EXAMPLE 2

1 g. of β-carotene dissolved in 100 cm.³ of chloroform was introduced into an identical apparatus to that of the preceding example. The solution was cooled to −30° C., and a solution of 0.66 g. of N-bromosuccinimide in 20 cm.³ of acetonitrile was then rapidly run in. After 30 seconds, the reaction mixture was poured into a mixture consisting of 24 g. of potassium iodide, 600 cm.³ of acetic acid, 36 g. of sodium bicarbonate and 24 cm.³ of water. Thereafter 36 cm.³ of N/10 sodium thiosulphate were added and the mixture was then stirred for 2 hours. The precipitate was filtered off and washed on the filter with 3 x 5 cm.³ portions of acetic acid. The precipitate was taken up in 100 cm.³ of chloroform. Measurement of the optical density of this solution showed that the amount of retrodehydro-β-carotene was 0.608 g., representing a yield of 60.8% relative to the β-carotene.

EXAMPLE 3

The experiment of Example 2 was repeated but the treatment with the alkali metal iodide was carried out with a mixture of 24 g. of potassum iodide, 600 cm.³ of acetone and 24 cm.³ of water. After the addition of thisulfate, a slight precipitate, consisting of unconverted β-carotene, formed in the reaction mixture. Measurement of the optical density of the acetone solution showed that the amount of retrodehydro-β-carotene was 0.53 g., representing a yield of 53% relative to the β-carotene.

We claim:

1. A process for the preparation of retrodehydro-β-carotene which comprises (i) reacting β-carotene with N-bromosuccinimide followed by (ii) dehydrobrominating the resulting brominated derivative in the presence of an alkali metal iodide and neutralizing of liberated iodine with an alkali metal thiosulfate.

2. The process according to claim 1 in which 1 to 3 mols of N-bromosuccinimide per mol of β-carotene are used in step (i).

3. The process according to claim 1 in which chloroform free from ethanol is used as solvent in step (i).

4. The process accordinng to claim 1 in which a temperature from −20° to −70° C. is employed in step (i).

5. The process according to claim 1 in which an initiator for radical reaction, is incorporated at the same time as N-bromosuccinimide.

6. The process according to claim 5 in which the initiator is benzoyl peroxide.

7. The process according to claim 1 in which a temperature from 0° to 20° C. is employed in step (ii).

8. The process according to claim 1 in which a mild alkali is added in step (ii).

9. The process according to claim 1 in which iodine which is liberated in step (ii) is reduced by reaction with added alkali metal thiosulphate.

References Cited

UNITED STATES PATENTS 2,871,267    1/1959    Petracek et al. _____ 260—666C

OTHER REFERENCES

Karrel: Helv. Chim. Acta 41, 984, 1958.

DELBERT E. GANTZ, Primary Examiner

V. O'KEEFE, Assistant Examiner